(12) United States Patent
Behkami et al.

(10) Patent No.: US 7,299,158 B2
(45) Date of Patent: Nov. 20, 2007

(54) PROCESS CONTROL DATA COLLECTION

(75) Inventors: Nima A. Behkami, Portland, OR (US);
Theodore O. Meyer, Portland, OR (US); Thomas C. Hann, Jr., Vancouver, WA (US)

(73) Assignee: LSI Corporation, Milpitas, CA (US)

( * ) Notice: Subject to any disclaimer, the term of this patent is extended or adjusted under 35 U.S.C. 154(b) by 396 days.

(21) Appl. No.: 10/799,851

(22) Filed: Mar. 12, 2004

(65) Prior Publication Data

US 2005/0203862 A1    Sep. 15, 2005

(51) Int. Cl.
*G06F 11/00* (2006.01)
*G06F 7/00* (2006.01)
(52) U.S. Cl. .......................................... 702/188; 707/1
(58) Field of Classification Search ................ 702/188, 702/6, 57, 81; 707/1, 102
See application file for complete search history.

(56) References Cited

U.S. PATENT DOCUMENTS 6,985,831 B2 *   1/2006   Ito et al. ..................... 702/188

\* cited by examiner

*Primary Examiner*—Don Wong
*Assistant Examiner*—Hung Tran Vy
(74) *Attorney, Agent, or Firm*—Luedeka, Neely & Graham

(57) ABSTRACT

A data collection system. A data input form receives data, and a message queue receives the data from the data input form, and temporarily manages the data until the data collection system can process the data. A temporary data storage temporarily stores the data received by the message queue while waiting for the data collection system to process the data. A transaction manager receives the data from the message queue and processes the data. A data logger logs the processing transactions of the transaction manager. A data loader receives the data from the transaction manager and prepares the data for storage. A data storage device receives the data from the data loader.

20 Claims, 3 Drawing Sheets

PROCESS CONTROL DATA COLLECTION

FIELD

This invention relates to the field of integrated circuit fabrication. More particularly, this invention relates to identifying, acquiring, storing, and using processing data that is generated during integrated circuit fabrication.

BACKGROUND

Modern integrated circuits are enormously complex devices. Typically, even the smallest fluctuations in the materials, processes, and designs by which they are fabricated are sufficient to either degrade the operation of the device so malformed or render it completely inoperable. Because of this, there has been a tremendous effort to monitor and control the nearly innumerable count of parameters which contribute to the success of the fabrication process. The heart of such efforts has traditionally been the statistical process control engine.

Statistical process control works by receiving a stream of data in regard to a given parameter. The parameter stream is plotted, typically in an order dependent manner, although other plotting bases can also be used. The parameter may be plotted in its raw form, or in a manipulated form. The parameter stream is also mathematically manipulated to determine desired statistical values in regard to the parameter. These desired statistical values enable one to quickly detect, and often to predict, one or more of a variety of different problems with the parameter. When such a problem is detected, an investigation can be made and corrective actions can be implemented. Thus, such statistical process control has been of great benefit to the integrated circuit fabrication industry, as implemented on a wide variety of parameters.

Because of the great utility of statistical process control, there has been a concerted effort to provide as much information to the control engines as possible. For this and other reasons, equipment manufacturers have offered data collecting and reporting modules for their equipment, which modules collect some of the processing data and send it to centralized databases. Such data is generally referred to as engineering data, and such collection systems are generally referred to as engineering data collection systems.

However, there is a great amount of data that cannot be automatically gathered by such engineering data collection systems, either because equipment manufacturers have not provided the capability to do so, or because the nature of the data does not lend itself well to such automated data collection. Various efforts have been made in the past to collect such data, such as by observing the data manually, and then recording it, such as by writing it into a log on a sheet of paper. Unfortunately, such methods tend to be unreliable, inconsistent, time consuming, difficult to expand across an entire fabrication facility, and difficult to monitor. Further, entry of such information into a statistical process control system tends to have the same problems.

What is needed, therefore, is a system by which data can be more reliably gathered and entered into a data processing system.

SUMMARY

The above and other needs are met by a data collection system according to the present invention. A data input form receives data, and a message queue receives the data from the data input form, and temporarily manages the data until the data collection system can process the data. A temporary data storage temporarily stores the data received by the message queue while waiting for the data collection system to process the data. A transaction manager receives the data from the message queue and processes the data. A data logger logs the processing transactions of the transaction manager. A data loader receives the data from the transaction manager and prepares the data for storage. A data storage device receives the data from the data loader.

In this manner, the data collection system according to the present invention provides means for collecting the data that would otherwise be lost during integrated circuit processing, because there is no automated way for it to be collected and stored. Further, the data collection system makes the data available in a form where it can be accessed by a statistical process control engine, thereby extending the benefits of statistical process control to data, and thereby to processes, which had previously not been accessible to such. Thus, the data collection system provides for an increased level of processing control.

In various embodiments, the input form resides on a presentation layer of the data collection system, the message queue, temporary data storage, transaction manager, data logger, and data loader all reside on a business logic layer of the data collection system, and the data storage device resides on a data service layer of the data collection system. The system preferably includes an output form for presenting statistically manipulated historical trends of the data. A statistical process control engine preferably receives the data from at least one of the transaction manager and the data storage device, and statistically manipulates the data. In one embodiment a state simulation engine gathers and provides state data between the data collection system and a statistical process control engine. The data input form is preferably implemented as a web object that is readable with a web browser. A web server preferably serves the data input form.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
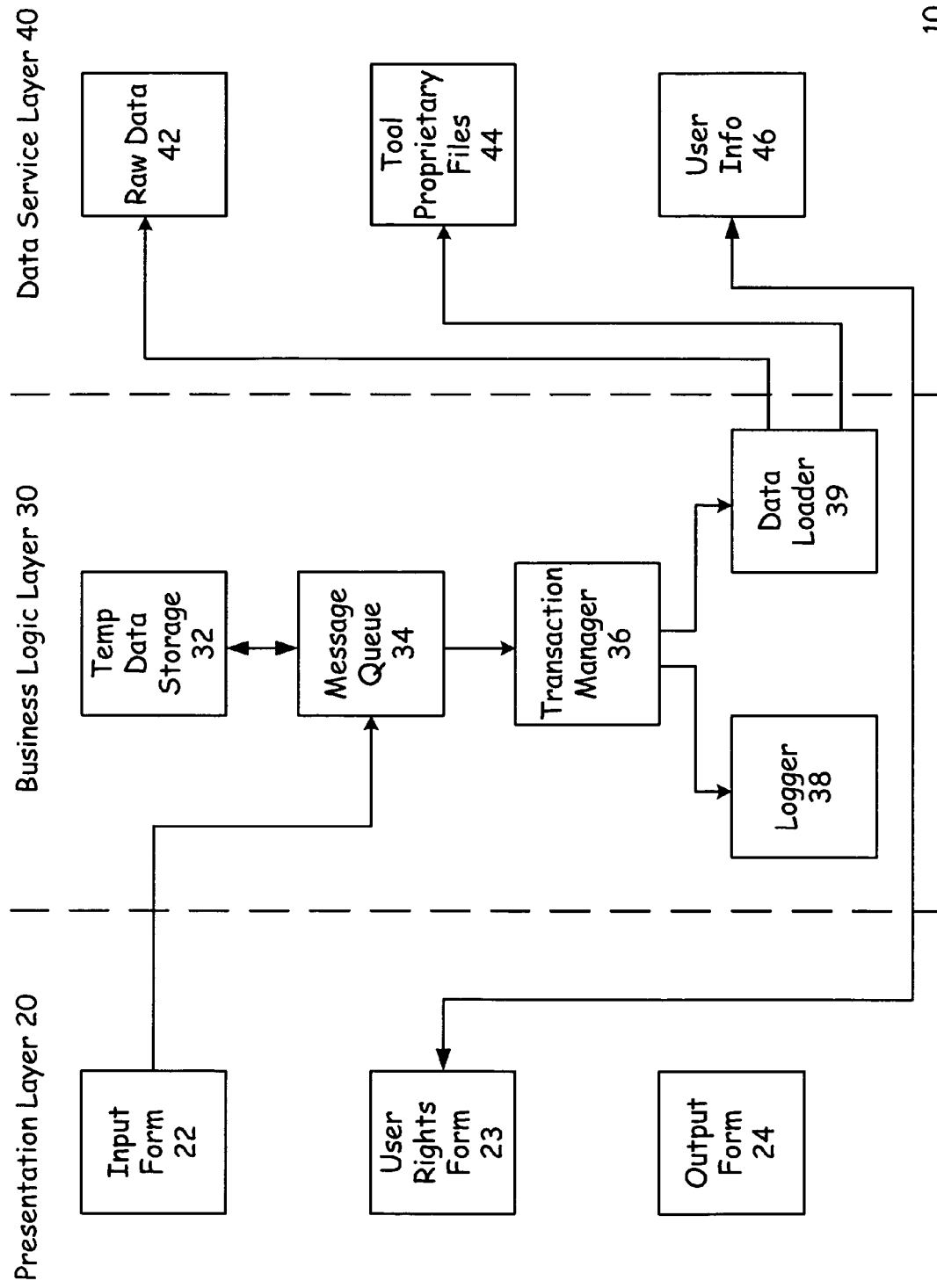
FIG. 1 is a functional block diagram of a data collection system according to a preferred embodiment of the present invention.

With reference now to FIG. 1, there is depicted a functional block diagram of a data collection system 10 according to a preferred embodiment of the present invention. As depicted in FIG. 1, the data collection system 10 is functionally divided into three different functional groups or layers, which are the presentation layer 20, the business logic layer 30, and the data service layer 40. The architecture of the data collection system 10 as given in FIG. 1 is structured using layers. However, it is appreciated that there are other software architecture structures as well, and that the data collection system 10 according to a preferred embodiment of the present invention is not limited to a layered architecture.

The presentation layer 10 of the data collection system 10 preferably handles data input and data output that is received from and presented to a user. Thus, the data collection system 10 preferably includes a data input screen 22, by which an operator can input various requested pieces of data. The data collection system 10 provides its output, such as control charts and so forth, using an output screen 24. Preferably, there are also screens 23 by which user and other rights are administered. Most preferably, the input screen 22 is presented at a location that is proximate the processing equipment or other source of the information that the operator is to enter into the data collection system 10 via the input screen 22. For example, the input screen 22 is preferably presented on a terminal or other display, such as that of a networked personal computer, residing adjacent an etch chamber, or any other data source.

The information entered in the input screen 22 of the presentational layer 20 is preferably written to a message queue 34 which resides within the business logic layer 30 of the data collection system 10. In addition, some information, commonly referred to as metadata, or data in regard to the data, which is received through the input screen 22 is also delivered to a user information module 46 that resides within the data service layer 40. The user information module 46 preferably enables a variety of housekeeping functions, such as ensuring that the operator has clearance to use the data input screen 22. Most preferably, all of the forms 22-24 are implemented as web objects, as described in more detail hereafter.

The information received by the message queue 34 is preferably written to a temporary data repository 32, where it can be read at a point in time when the transaction manager 36 is available to process the data that has been input. Thus, the transaction manager 36 preferably requests and reads the input data from the message queue 34, which fetches it as requested from the temporary data repository 32. Most preferably, a logger 38 receives information from the transaction manager 36, which provides a historical record of the functions performed by the transaction manager 36.

The input data itself is forwarded to a data loader module 39, which determines the proper data repository for the input data, which data repositories are preferably implemented on the data service layer 40, as depicted in FIG. 1. The data loader module 39 preferably submits the input data to a raw data repository 42, where it is available to other data processing systems. Most preferably, the raw data repository 42 is external to the other elements of the data collection system 10, and is available over a network, such as network attached storage, or on a server. Most preferably, the hardware platforms for the data collection system 10 are highly distributed, and may reside at several locations within a network.

The data loader module 39 preferably associates the input data as stored on the raw data repository 42 with information that it reads from a tool properties files 44, which contains information in regard to the tool from which the input data was taken, or which is associated with the input data. The transaction manager receives or accesses a message from the message queue and verifies the message for content and completeness. The transaction is preferably sent to the data loader, where the transaction is converted to the appropriate structure for loading to the target data system. The data loader preferably retrieves and updates the tool properties files where critical information for tool and tool conditions are stored. The feed back from the data loader to the transaction manager is preferably used to log the event results and, if needed, the message is preferably re-queued in the message queue, if the transaction was not completed do to resource availability. For other transaction failures, the message can be achieved for later evaluation and the logged performed. Thus, the data collection system 10 provides for a systemized method of collecting data that would otherwise be lost during processing because there is no provision for the automatic collection of the information.

For example, information in many engineering data collection systems is wafer-centric, or in other words is referenced via the identity of a processed wafer to which all data is associated. The implication for this is that if there is any information that is not associated with a given processed wafer, then it doesn't fit neatly into the traditional engineering data collection system, and tends to get overlooked. The present system overcomes these shortcoming of the prior art data collection systems, by allowing information to be gathered without reference to a processed wafer. However, the data collection system 10 according to the present invention could also reference information in regard to processed wafers, if so desired.

Figure 2:
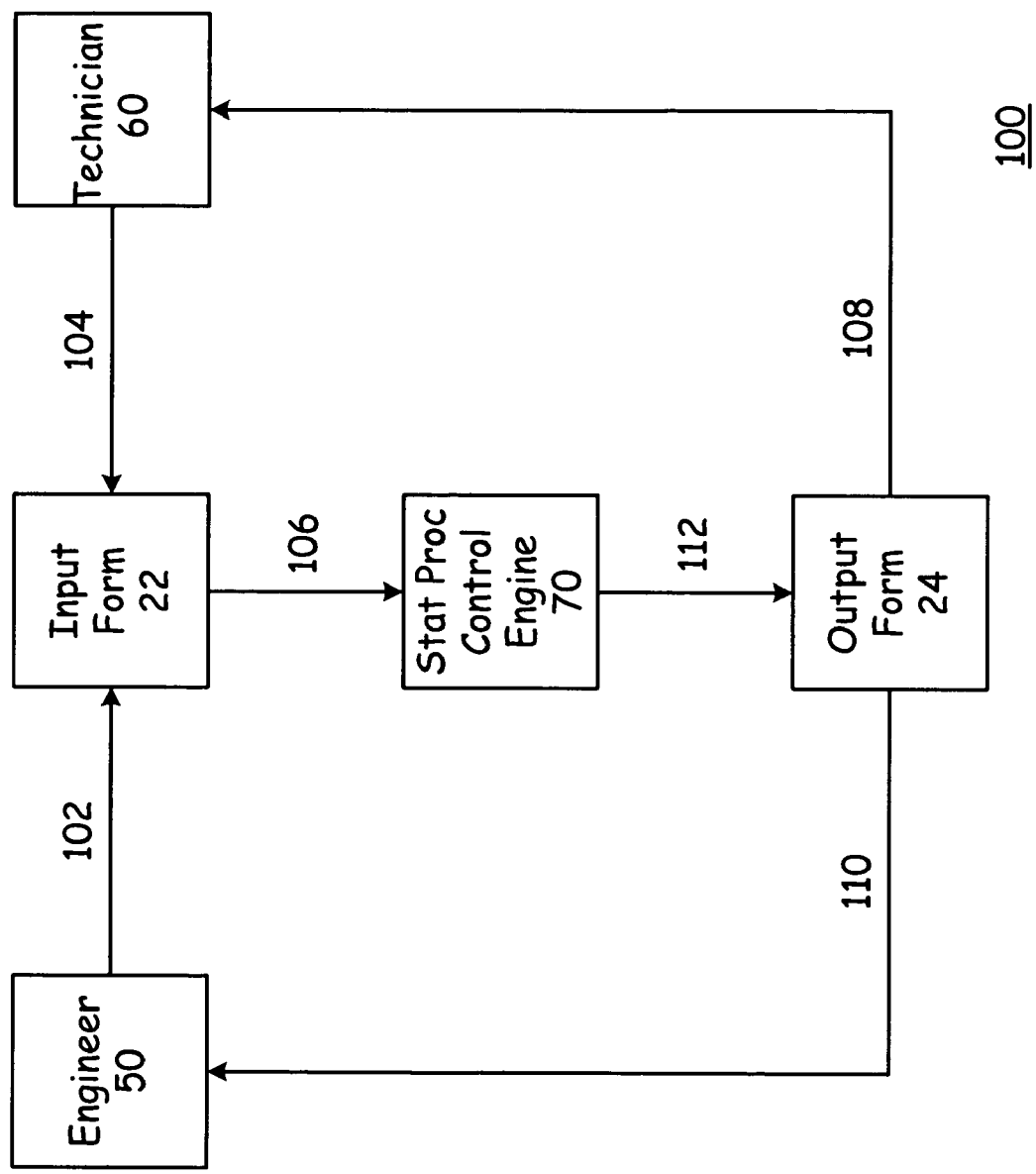
FIG. 2 is a functional interaction flow chart depicting a method of using a data collection system according to a preferred embodiment of the present invention.

This collected data is preferably then used, such as described above, to variously improve the fabrication process, improve the material handling, control processes or other elements, and so forth. FIG. 2 provides a functional interaction flow chart depicting a method 100 of using the data collection system 10 and the data which it collects, according to a preferred embodiment of the present invention.

Preferably, an engineer 50 or other designer of the data collection process builds a web based data input form 22, as given by transaction 102. As a part of this process, the engineer preferably defines the parameters to be collected, identifies the parameter attributes of interest, and publishes the data collection form 22 for use by technicians 60, such as within the fabrication facility.

As will be discussed in more detail below, the system is most preferably implemented with web interfaces, so that client computers can access the data collection system 10 via a simple web browser operating on any desired platform. However, the system 10 could be implemented on other platforms as well, and could be implemented on a proprietary platform if so desired. The engineer 50 determines what information should be gathered and entered into the data input form 22, and creates as many such data input forms 22 as desired. Obviously, additionally engineers 50 or others can also create additional forms.

A technician or operator 60 enters the data into the data input form 22, as given by transaction 104. For example, the technician 60 may enter a temperature reading, or some other parameter that is requested by the engineer 50 via the data input form 22. In order to do so, the technician 60 may need to take a measurement that is not automatically made otherwise. The information is input to the input form 22, and submitted to the data collection system 10 with the other desired information, such as by pressing a button within the form to enter the data.

Once the information has been input, it is preferably either accessible to or automatically submitted to a statistical process control application 70, as indicated by transaction 106. The statistical process control application 70 is in one embodiment a dedicated statistical engine which is proprietary to the data collection system 10, or is alternately a statistical engine that is selected as desired from a library of such by the engineer 50. However, in the most preferred embodiment, the statistical process control application 70 is the main statistical engine for the facility in which the data collection system 10 is implemented.

Thus, it is most preferred that the data be submitted automatically to the statistical engine 70, so that it can produce output forms 24 from the data, such as statistical process control charts, and other such reporting mechanisms, as given in transaction 112. Thus, the input data is preferably routed to the appropriate output forms 24. If the data indicates that there is some type of problem, such as if a predefined limit or trend is violated, then the system 10 preferably provides an appropriate alert.

The control charts 24 are preferably available immediately for real time analysis by the technician 60, as given in transaction 108, so that action can be taken if something is wrong. In addition, the control charts 24 are also preferably available for an offline analysis, such as by the engineer 50 as given in transaction 110. As mentioned above, such output is preferably provided via a web interface so that it can be accessed in a platform independent manner. However, in other embodiments, the manipulated data output may be provided in a more proprietary or platform dependent manner.

It has typically been somewhat difficult to integrate a software program such as the data collection system 10 described above with another system such as an existing statistical process control system. In addition, it is likewise difficult to integrate a system like the data collection system 10 into a web based interface, even though there are tremendous benefits to doing so. The problems generally center around the inability of one or both of the programs to be aware of the other, in that they were not originally designed to interoperate.

For two or more programs to interoperate as a unified application, each program is preferably made aware of the operating state of all other programs in the application, according to a preferred embodiment of the present invention. Thus, there are three levels of so called state information that are preferably provided to all programs within an application, which are the individual program states, the application state, and the business transaction state. State information preferably includes a designation of a program's parameters, the value of those parameters, and the operating state of the program. The state information is preferably stored throughout the running life of the application, and thus can be called on at any time. When a program is able to access such state data, then it is able to coexist with other programs within a unified application.

Figure 3:
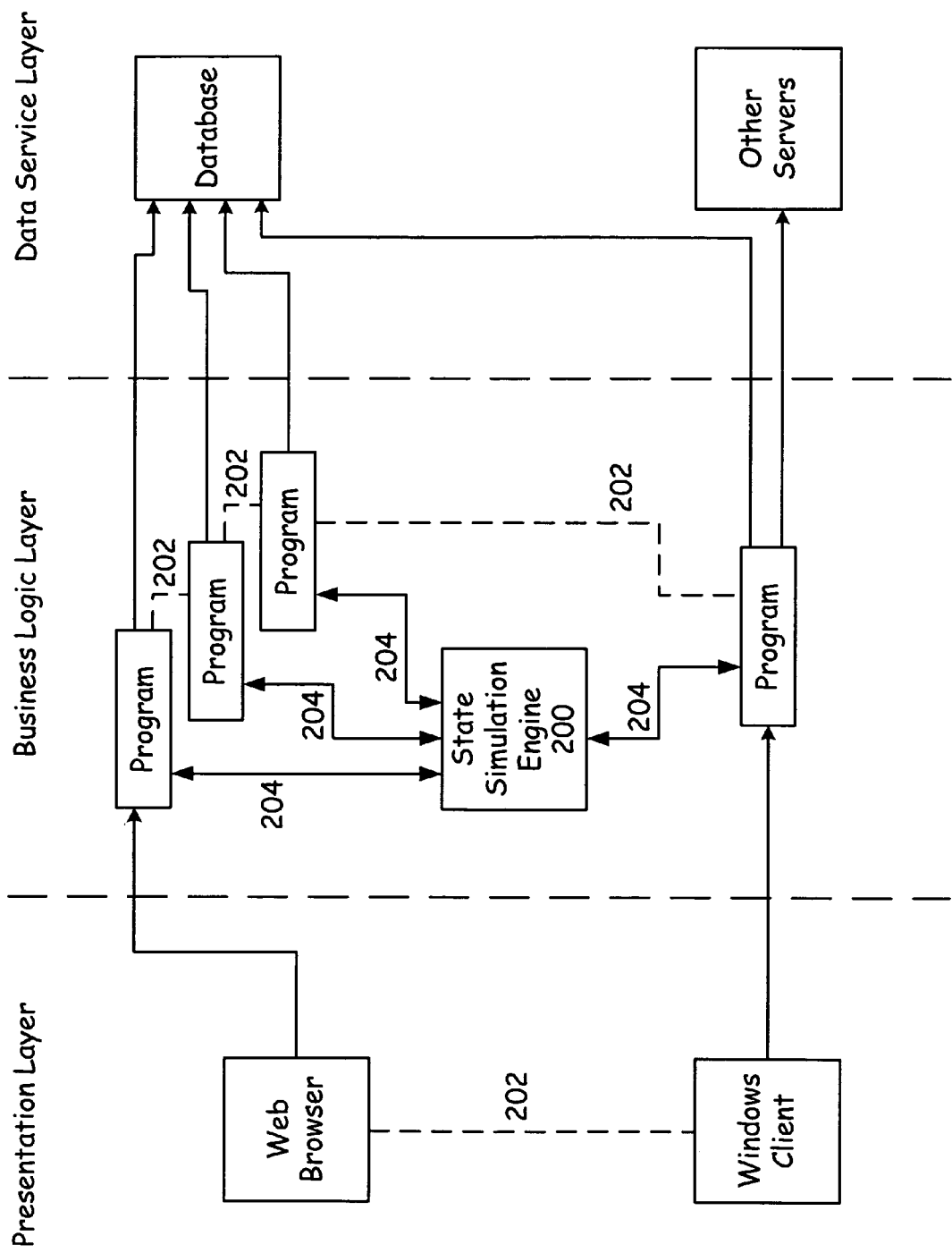
FIG. 3 is a functional block diagram of a computerized system, such as a data collection system, employing a state simulation engine according to a preferred embodiment of the present invention.

This goal is preferably accomplished with the use of a state simulation engine 200, which most preferably operates in conjunction with the data collection system 10 and the statistical process control engine 70, as depicted in FIG. 3. The state simulation engine 200 preferably can either permit or restrict the sharing of information between different program which make up a given application. For example, one program could be the data collection system 10 and another program could be the statistical process control engine 70.

Communication between the various programs of the application is preferably accomplished through application programming interfaces, which are built into the individual programs, and which the state simulation engine 200 can be programmed to receive data from and provide data to as represented by lines 204 in FIG. 3. Thus, the state simulation engine 200 provides indirect paths for every program in the application to be made aware of what it needs to know about the other programs, which paths are indicated by virtual connections 202 in FIG. 3.

Thus, the preferred embodiments of the present invention enable the collection and use of data that would typically be lost during the integrated circuit fabrication process. Therefore, the present invention allows for greater control, tracking, and prediction of the processes so used. Further, the present invention provides a way for a data collection system to be integrated with a statistical process control engine, and for the entire application to be accessed through web applications.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A data collection system, comprising:
   a data input form adapted for presentation on a display and to receive data from an operator,
   a message queue for receiving the data from the data input form, and temporarily managing the data until the data collection system can process the data,
   a temporary data storage for receiving the data directly from and temporarily storing the data received by the message queue while waiting for the data collection system to process the data,
   a transaction manager for receiving the data directly from the message queue and processing the data,
   a data logger, for logging the processing transactions of the transaction manager,
   a data loader for receiving the data from the transaction manager and preparing the data for storage, and
   a data storage device, for receiving the data from the data loader.

2. The data collection system of claim 1, wherein the input form resides on a presentation layer of the data collection system.

3. The data collection system of claim 1, wherein the message queue, temporary data storage, transaction manager, data logger, and data loader all reside on a business logic layer of the data collection system.

4. The data collection system of claim 1, wherein the data storage device resides on a data service layer of the data collection system.

5. The data collection system of claim 1, further comprising an output form for presenting statistically manipulated historical trends of the data.

6. The data collection system of claim 1, further comprising a statistical process control engine for receiving the data from at least one of the transaction manager and the data storage device, and statistically manipulating the data.

7. The data collection system of claim 1, further comprising a state simulation engine for gathering and providing state data between the data collection system and a statistical process control engine.

8. The data collection system of claim 1, wherein the data input form is implemented as a web object that is readable with a web browser.

9. The data collection system of claim 1, further comprising a web server for serving the data input form.

10. A data collection system, comprising:
a presentation layer including,
a data input form adapted for presentation on a display and to receive data from an operator, and
an output form for presenting statistically manipulated historical trends of the data,
a business logic layer including,
a message queue for receiving the data from the data input form, and temporarily managing the data until the data collection system can process the data,
a temporary data storage for receiving the data directly from and temporarily storing the data received by the message queue while waiting for the data collection system to process the data,
a transaction manager for receiving the data directly from the message queue and processing the data,
a data logger, for logging the processing transactions of the transaction manager, and
a data loader for receiving the data from the transaction manager and preparing the data for storage, and
a data service layer including,
a data storage device, for receiving the data from the data loader.

11. The data collection system of claim 10, further comprising a statistical process control engine for receiving the data from at least one of the transaction manager and the data storage device, and statistically manipulating the data.

12. The data collection system of claim 10, further comprising a state simulation engine for gathering and providing state data between the data collection system and a statistical process control engine.

13. The data collection system of claim 10, wherein the data input form is implemented as a web object that is readable with a web browser.

14. The data collection system of claim 10, further comprising a web server for serving the data input form.

15. A data collection system, comprising:
a data input form adapted for presentation on a display and to receive data from an operator,
a message queue for receiving the data from the data input form, and temporarily managing the data until the data collection system can process the data,
a temporary data storage for receiving the data directly from and temporarily storing the data received by the message queue while waiting for the data collection system to process the data,
a transaction manager for receiving the data directly from the message queue and processing the data,
a data logger, for logging the processing transactions of the transaction manager,
a data loader for receiving the data from the transaction manager and preparing the data for storage,
a data storage device, for receiving the data from the data loader,
a statistical process control engine for receiving the data from at least one of the transaction manager and the data storage device, and statistically manipulating the data,
a state simulation engine for gathering and providing state data between the data collection system and a statistical process control engine, and
an output form for presenting statistically manipulated historical trends of the data.

16. The data collection system of claim 15, wherein the input form resides on a presentation layer of the data collection system.

17. The data collection system of claim 15, wherein the message queue, temporary data storage, transaction manager, data logger, and data loader all reside on a business logic layer of the data collection system.

18. The data collection system of claim 15, wherein the data storage device resides on a data service layer of the data collection system.

19. The data collection system of claim 15, wherein the data input form is implemented as a web object that is readable with a web browser.

20. The data collection system of claim 15, further comprising a web server for serving the data input form.

* * * * *